United States Patent
Panza et al.

(10) Patent No.: US 11,091,373 B2
(45) Date of Patent: Aug. 17, 2021

(54) METHOD FOR REVAMPING AN AMMONIA PLANT

(71) Applicant: Casale SA, Lugano (CH)

(72) Inventors: Sergio Panza, Como (IT); Costantino Bruni, Lugano (CH)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 15/529,034

(22) PCT Filed: Sep. 24, 2015

(86) PCT No.: PCT/EP2015/071995
§ 371 (c)(1),
(2) Date: May 23, 2017

(87) PCT Pub. No.: WO2016/082973
PCT Pub. Date: Jun. 2, 2016

(65) Prior Publication Data
US 2017/0260060 A1    Sep. 14, 2017

(30) Foreign Application Priority Data
Nov. 27, 2014  (EP) .................... 14195269

(51) Int. Cl.
*C01C 1/04* (2006.01)
*C01B 3/02* (2006.01)
*B01J 3/00* (2006.01)

(52) U.S. Cl.
CPC ............. *C01C 1/04* (2013.01); *B01J 3/006* (2013.01); *C01B 3/025* (2013.01);
(Continued)

(58) Field of Classification Search
CPC ............. B01J 2219/00024; B01J 3/006; C01B 2203/0233; C01B 2203/0244;
(Continued)

(56) References Cited

U.S. PATENT DOCUMENTS

| 5,736,116 A | 4/1998 | LeBlanc et al. |
| 2006/0228284 A1* | 10/2006 | Schmidt ............ C01B 3/36 423/352 |

FOREIGN PATENT DOCUMENTS

| EP | 2 022 754 A1 | 2/2009 |
| EP | 2135841 A1 | 12/2009 |

(Continued)

OTHER PUBLICATIONS

Sahafzadeh et al. "Integration of a gas turbine with an ammonia process for improving energy efficiency", Applied Thermal Engineering 58 (2013) 594e604 (Year: 2013).*
(Continued)

*Primary Examiner* — Anthony J Zimmer
*Assistant Examiner* — Syed T Iqbal
(74) *Attorney, Agent, or Firm* — Akerman LLP

(57) ABSTRACT

A method for revamping an ammonia plant including a steam system, said steam system comprising at least a high-pressure section operating at a first pressure and a medium-pressure section operating at a second pressure lower than said first pressure, the revamping including: the provision of at least one additional heat recovery by means of a steam flow at a third pressure which is intermediate between said first and second pressure, and the provision of a steam export line arranged to export outside the ammonia plant at least a portion of said steam flow at said third pressure.

8 Claims, 3 Drawing Sheets

(52) U.S. Cl.
CPC ............... *B01J 2219/00024* (2013.01); *C01B 2203/0233* (2013.01); *C01B 2203/0244* (2013.01); *C01B 2203/04* (2013.01); *C01B 2203/068* (2013.01); *C01B 2203/1241* (2013.01); *C01B 2203/142* (2013.01)

(58) Field of Classification Search
CPC .......... C01B 2203/04; C01B 2203/068; C01B 2203/1241; C01B 2203/142; C01B 3/025; C01C 1/04
See application file for complete search history.

(56) References Cited

FOREIGN PATENT DOCUMENTS

| | | |
|---|---|---|
| EP | 2556024 A1 | 2/2013 |
| RU | 2174942 C2 | 10/2001 |
| RU | 2225356 C2 | 3/2004 |
| RU | 2250894 C2 | 4/2005 |

OTHER PUBLICATIONS

International Search Report issued in connection with PCT/EP2015/077605.
"New Plants for Old", Nitrogen + Syngas, British Sulphur Publishing, London, GB, No. 291, Jan. 1, 2008, pp. 30-47.
Singh et al., "New KBR Ammonia Synthesis Loop Revamp Technology Improves Plant Energy Efficiency", Feb. 1, 2009, http://www.kbr.com/Newsroom/Publications/Technical-Papers/New-KBR-Ammonia-Synthesis-Loop-Revamp-Technology-Improves-Plant-Evergy-Efficiency.pdf.

* cited by examiner

METHOD FOR REVAMPING AN AMMONIA PLANT

This application is a national phase of PCT/EP2015/071995, filed Sep. 24, 2015, and claims priority to EP 14195269.7, filed Nov. 27, 2014, the entire contents of both of which are hereby incorporated by reference.

FIELD OF APPLICATION

The invention relates to the revamping of ammonia plants. The invention involves more in detail the revamping of the steam system of an ammonia plant.

PRIOR ART

A plant for the synthesis of ammonia comprises basically a front-end for the generation of a make-up gas and a synthesis loop. The front end generally comprises a hydrocarbon reforming stage and a purification stage, the latter including for example a shift converter, a CO2 removal section and a methanator. A plant for producing ammonia is described for example in EP 2 022 754.

An ammonia plant includes also a so-called steam system including several steam producers and steam users.

Steam producers may include, for example, heat exchangers where heat is removed from a hot stream, such as gas coolers. For example, the reforming stage typically comprises a primary reformer and a secondary reformer; the product gas leaving the primary reformer is cooled before admittance to the secondary reformer, and the hot effluent of the secondary reformer, usually at a temperature close to 1000° C., must be cooled before purification. The gas cooling is typically effected in shell-and-tube heat exchangers which produces saturated or superheated steam at a certain pressure, depending on the temperature of the hot source.

Steam users include steam turbines to drive the rotating machines of the plant such as compressors and pumps. Among the largest steam users are the steam turbines which drive the synthesis gas compressor and air compressor of the reforming stage. Other steam users may comprise equipment which need a heat input, for example CO2 removal systems which require low-grade steam. Steam can also be used as process steam, typically for steam reforming in the front-end.

Steam can be produced at one or more pressure levels, for example a large ammonia plant comprises high-pressure steam lines and medium and/or low-pressure steam lines. Depending on the balance between the production and consumption of steam, the steam system may include steam export or import at different pressures. Generally speaking, it is preferred to expand high-pressure steam in one or more turbines to produce work, while steam generated at a lower pressure is generally used to furnish heat or as process steam.

Large installation may comprise several ammonia plants and, in that case, an ammonia plant may export or import steam to/from other ammonia plants.

The purpose of the steam system is to internally recover as much energy as possible, to fulfil the power and/or heat demand of the plant itself, thus reducing the input of energy from external sources. Hence, the steam system is a key component for efficiency. Energy can be imported in the form of fuel, steam from external production or electric energy.

Revamping of ammonia plants is generally directed to increase capacity in terms of ammonia which is produced (tons/day) and/or efficiency. A revamping involving the modernization of the plant will generally result in additional steam recoverable from the process. However, especially in old plants, it may happen that the additional steam cannot be used as such due to lack of a proper steam user in the same ammonia plant or another ammonia plant of the same installation.

This problem is encountered, in particular, when revamping older ammonia plants having a medium-pressure steam system at a relatively low pressure, say around 30 bar. Revamping may result in an additional amount of steam theoretically available at a higher pressure, but in absence of a steam user working at the same pressure, the advantage is lost. Adaptation of existing medium-pressure section to a higher pressure level is not feasible from an economical and mechanical point of view, and hence the only solution in the prior art is lowering the pressure of the steam, e.g. in a let-down valve, which however is inefficient resulting in steam of a lower grade and quality.

SUMMARY OF THE INVENTION

The aim of the invention is to overcome the above drawbacks, providing a method for attractive revamping of ammonia plants. This aim is reached with a method of revamping an ammonia plant according to the attached claims. Preferred features of the invention are stated in the dependent claims.

The invention involves the provision of at least one additional heat recovery by means of a steam flow at an intermediate medium-high pressure, higher than the original medium pressure of the steam system, and exporting at least part of said steam flow outside the plant, where the energy content of said steam can be suitably exploited.

In a preferred embodiment, the invention involves the installation of a new high-pressure steam user, which may replace an existing medium-pressure user. Said steam flow at intermediate pressure is taken from said newly installed steam user. For example, said steam flow may be obtained by an extraction line of a steam turbine.

Accordingly, a preferred embodiment of the invention includes the installation of a new steam turbine in the high-pressure section of the steam system, said steam turbine having a steam extraction at an intermediate pressure between the design high- and medium-pressure of the ammonia plant. At least a portion of steam extracted from the newly-installed turbine, at said intermediate pressure, is exported outside the ammonia plant for further use.

Said intermediate pressure, in all the embodiments of the invention, is preferably at least 5 bar higher than the original medium pressure of the ammonia plant. For example the high-pressure steam section of the original plant operates at a pressure around 100 bar; the existing medium-pressure section operates at less than 40 bar, such as 30-35 bar, and the pressure of steam extracted from the newly-installed turbine is in the range 40-60 bar.

Preferably, the revamped ammonia plant is part of an installation including other ammonia plants, and the steam at said intermediate pressure is exported to another ammonia plant of the installation, having a medium-pressure steam section operating at said pressure.

An advantage of the invention is that the ammonia plant can be revamped without being bound by the pressure levels of the existing steam system. In particular, an additional amount of heat is made available at a novel pressure level, situated between the medium level and the high level of the steam system. Exporting the steam has the advantage that there is no need to modify the existing medium-pressure steam system to cope with a higher pressure level, but on the other hand the higher grade of the steam is duly exploited.

The advantages of the invention will be more evident with the help of the following detailed description.

DETAILED DESCRIPTION

Figure 1:
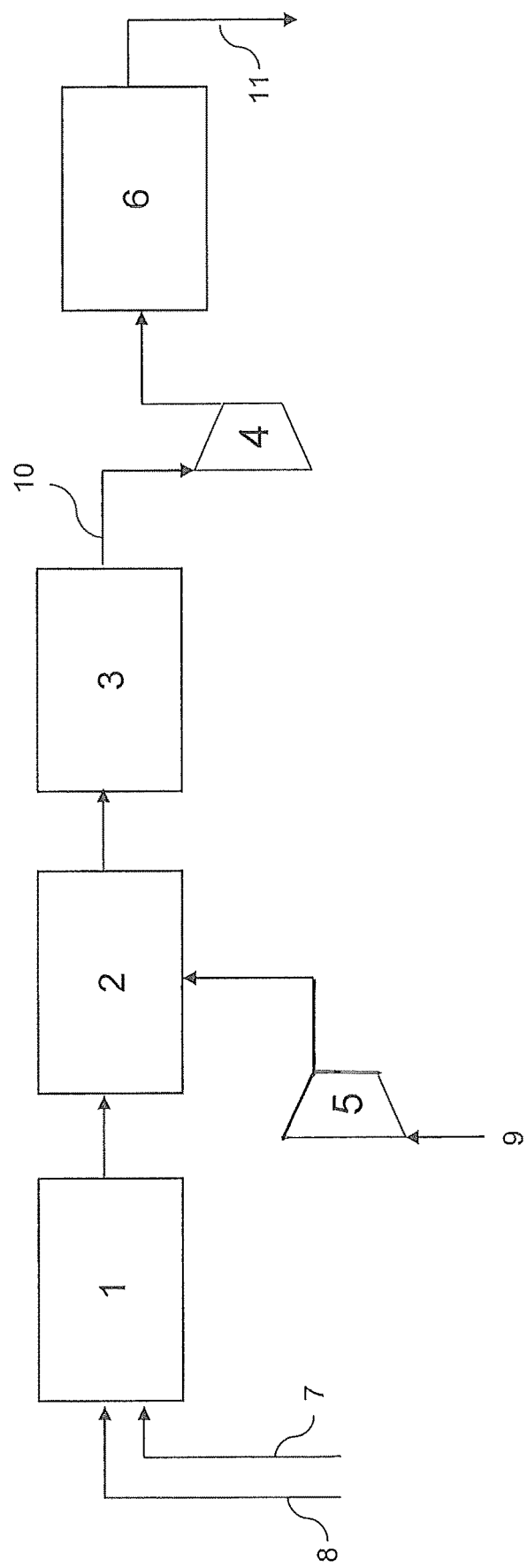
FIG. 1 is a scheme of an ammonia plant.

FIG. 1 is a basic scheme of an ammonia plant including a primary reforming section 1, a secondary reforming section 2, a purifying section 3, a syngas compressor 4, an air compressor 5 and an ammonia synthesis loop 6.

Natural gas 7 is steam reformed the primary and secondary reforming sections with the help of steam 8 and air 9 admitted to the secondary section. In some embodiments said air 9 may be enriched or replaced with oxygen. The purified syngas 10 is compressed and sent to loop 6 for production of ammonia 11.

The scheme of FIG. 1 is well known and needs no further description.

Figure 2:
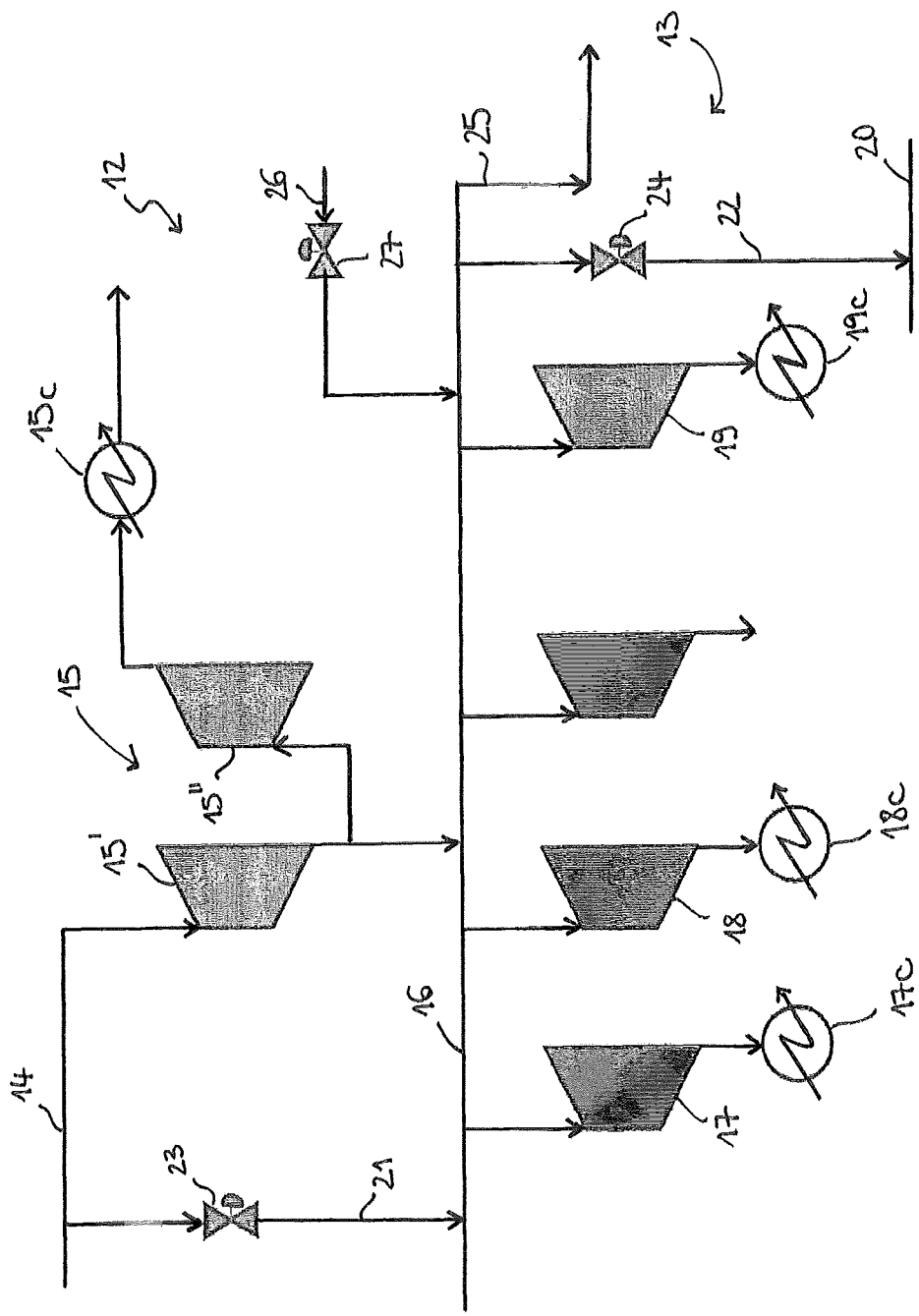
FIG. 2 is an exemplary scheme of a portion of a steam system of the ammonia plant of FIG. 1, before revamping.

The plant of FIG. 1 comprises a steam system and some components of said steam system are shown in FIG. 2.

The steam system comprises a high-pressure section 12 operating for example at 100 bar and a medium-pressure section 13 operating for example at 35 bar.

The high-pressure section 12 comprises a main steam header 14 feeding a steam turbine 15 which drives the syngas compressor 4. In the example, the steam turbine 15 includes a first stage 15' and a second stage 15", and part of steam extracted from the first stage is sent to the medium-pressure section 13.

The medium-pressure section 13 comprises a main steam header 16 feeding other steam users such as, for example, a steam turbine 17 driving the air compressor 5; a steam turbine 18 driving a feed water pump; a steam turbine 19 driving a refrigerant compressor.

The numerals 15c, 17c, 18c and 19c denote condensers of the turbines 15, 17, 18 and 19 respectively.

The steam system comprises also a low-pressure header 20. Steam may pass from the high to medium pressure and from medium to low pressure via lines 21 and 22 including a let-down valve 23, 24.

The line 25 denotes medium-pressure steam sent to the front-end, and line 26 denoted steam which is imported at a pressure higher than the medium pressure, for example 45 bar. This steam 26 can be imported from another ammonia plant having a medium pressure steam section at said pressure level of 45 bar. It can be noted that said steam, despite being available at 45 bar must be let down in the valve 27, to connect the line 26 to the steam header 16 at a lower pressure. Hence, a significant amount of energy of steam of line 26 is lost.

Figure 3:
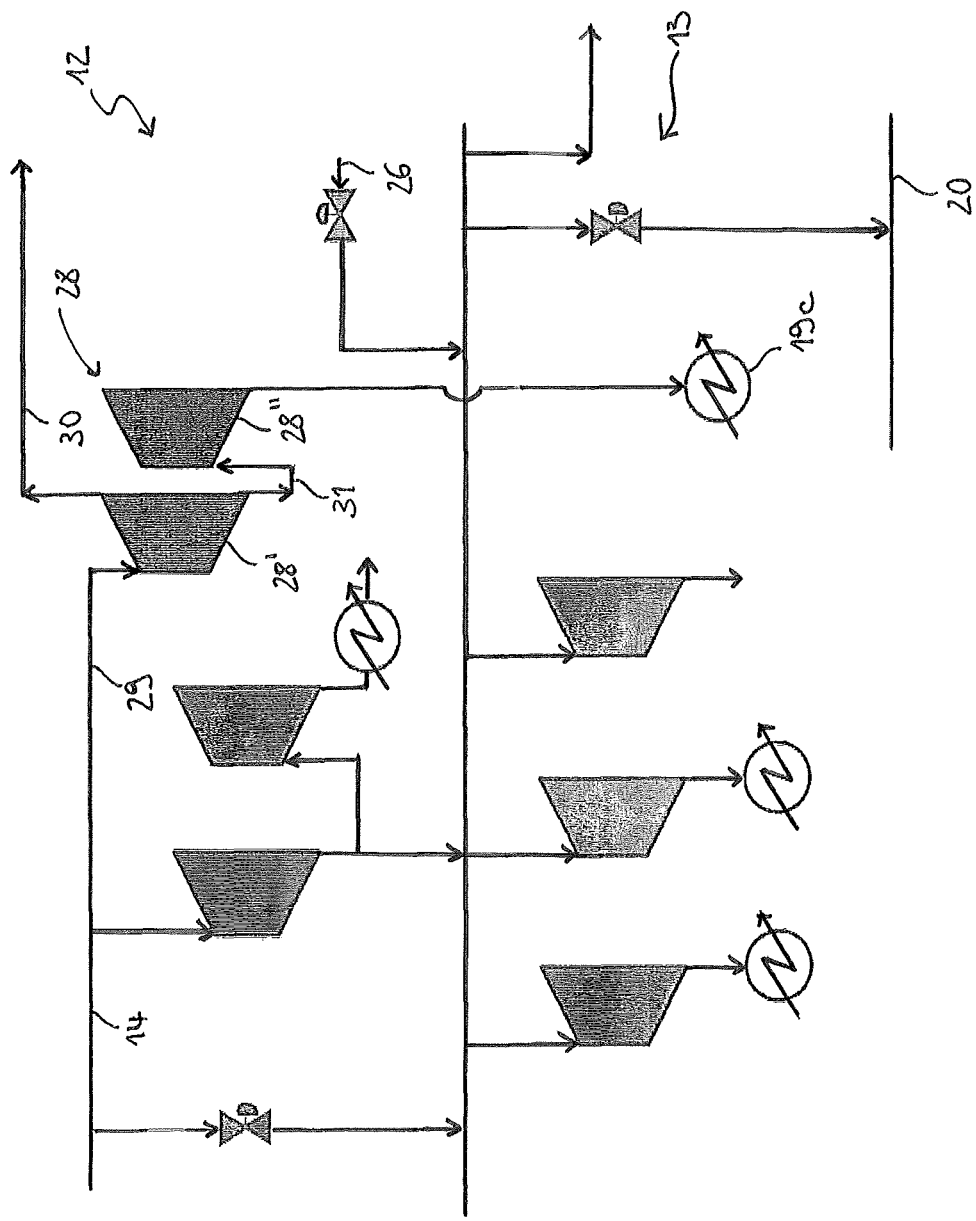
FIG. 3 is the scheme of FIG. 2 after a revamping which is carried out in accordance with an embodiment of the invention.

FIG. 3 shows the scheme after revamping. The medium-pressure turbine 19 is discontinued and replaced by a new high-pressure turbine 28 including stages 28' and 28", fed through line 29 with a portion of the high-pressure steam of header 14. A portion of the steam leaving the first stage 28' is extracted via line 30 after expansion (steam extraction), while the remaining portion is sent to the second stage 28" with line 31 for further expansion.

The extracted steam portion of line 30 is then exported at a pressure higher than the design pressure of the MP section 3, for example 50 bar. More preferably this pressure is substantially the same as the pressure of a medium-pressure section of the steam system of another ammonia plant of the same facility. Hence the steam of line 30 can be efficiently exported from the revamped ammonia plant to this another ammonia plant. Part or all of the steam of line 30 may also return via the line 26 after use. The outlet of the second stage 28" is sent to the condenser 19c previously connected with the medium-pressure turbine 19.

The invention claimed is:

1. A method for revamping a pre-existing ammonia plant including a steam system, said steam system comprising at least a first section operating at a first pressure and a second section operating at a second pressure lower than said first pressure,
the revamping including:
installation of a new steam user in the first section of the steam system, said new steam user having a steam input taken from the first section and a steam output providing a steam flow at a third pressure which is intermediate between said first and second pressure, for a heat recovery, and
provision of a steam export line arranged to export outside the ammonia plant at least a portion of said steam flow at said third pressure.

2. The method according to claim 1, wherein:
said ammonia plant is part of an installation including other ammonia plants, and
said steam is exported to another ammonia plant of the installation, having a medium-pressure steam section operating at said third pressure.

3. The method according to claim 1, wherein operation of an existing medium-pressure steam user of the steam system is discontinued, and the discontinued steam user is replaced by said new high-pressure steam user.

4. The method according to claim 1, said new high-pressure steam user being a steam turbine, comprising a steam extraction to provide said steam flow at said third pressure.

5. The method according to claim 1, wherein operation of an existing steam turbine of the ammonia plant, fed with steam at said second pressure, is discontinued, and said existing steam turbine is replaced by said new steam turbine.

6. The method according to claim 3, wherein said new steam turbine is a multi-stage turbine, and said steam extraction being taken after one or more stage(s) of the turbine.

7. The method according to claim 1, wherein said third pressure is at least 5 bar above said second pressure.

8. The method according to claim 1, wherein said second pressure is less than 40 bar and said third pressure is 40 to 60 bar.

* * * * *